United States Patent
Kosel et al.

(10) Patent No.: US 6,796,765 B2
(45) Date of Patent: Sep. 28, 2004

(54) METHODS AND APPARATUS FOR ASSEMBLING GAS TURBINE ENGINE STRUTS

(75) Inventors: Russell Dean Kosel, Cincinnati, OH (US); Paul Bernard Stumbo, Wyoming, OH (US); Arshad Rehman, Westchester, OH (US)

(73) Assignee: General Electric Company, Schenectady, NY (US)

( * ) Notice: Subject to any disclaimer, the term of this patent is extended or adjusted under 35 U.S.C. 154(b) by 309 days.

(21) Appl. No.: 10/034,970

(22) Filed: Dec. 27, 2001

(65) Prior Publication Data

US 2003/0123976 A1 Jul. 3, 2003

(51) Int. Cl.[7] .............................................. F01D 25/04

(52) U.S. Cl. ........................ 415/142; 415/119; 415/191; 415/208.2; 29/464; 29/523; 29/889.72; 411/43; 411/69

(58) Field of Search ................................. 415/142, 119, 415/191, 208.1, 208.2, 218.1, 219.1; 416/232, 233, 229 R, 229 A; 29/889.72, 464, 523; 411/43, 69, 70; 72/370.07

(56) References Cited

U.S. PATENT DOCUMENTS

| | | | | | |
|---|---|---|---|---|---|
| 2,340,133 | A | * | 1/1944 | Martin | .................... 416/229 R |
| 4,815,193 | A | * | 3/1989 | Gutnik | ......................... 29/509 |
| 4,993,918 | A | * | 2/1991 | Myers et al. | ................ 415/191 |
| 5,272,869 | A | | 12/1993 | Dawson et al. | |
| 5,284,011 | A | * | 2/1994 | Von Benken | ................ 415/119 |
| 5,292,227 | A | | 3/1994 | Czachor et al. | |
| 5,356,264 | A | * | 10/1994 | Watson et al. | ............... 415/119 |
| 5,438,756 | A | | 8/1995 | Halchak et al. | |
| 5,483,792 | A | | 1/1996 | Czachor et al. | |

FOREIGN PATENT DOCUMENTS

| | | | | | |
|---|---|---|---|---|---|
| DE | | 2319221 A | * | 10/1973 | .................. 411/70 |
| GB | | 472329 A | * | 9/1937 | .................. 411/70 |

* cited by examiner

*Primary Examiner*—Christopher Verdier
(74) *Attorney, Agent, or Firm*—William Scott Andes; Armstrong Teasdale LLP

(57) ABSTRACT

A method for installing an expandable stiffener includes providing an assembly including a first sidewall and a second sidewall connected at a leading and trailing edge such that a cavity is defined therebetween, forming an opening extending through the first sidewall and the second sidewall, inserting a first expandable sleeve through the assembly opening such that the sleeve extends between the first and second strut sidewalls, and coupling the sleeve to the first and second sidewalls.

17 Claims, 3 Drawing Sheets

METHODS AND APPARATUS FOR ASSEMBLING GAS TURBINE ENGINE STRUTS

BACKGROUND OF THE INVENTION

This invention relates generally to gas turbine engines and more particularly, to methods and apparatus for assembling gas turbine engine struts.

At least some known gas turbine engines include one or more rotor shafts supported by bearings which, in turn, are supported by annular frames. Each frame includes an annular casing spaced radially outwardly from an annular hub and a plurality of circumferentially spaced apart struts extending therebetween which direct a pre-determined air flow downstream from the frame. The struts may be integrally formed with the casing and hub in a common casting, for example, or may be suitably bolted thereto. Each strut includes a pair of sidewalls coupled at a leading edge and a trailing edge, such that a cavity is defined therebetween.

In either aforementioned strut configuration, the struts facilitate providing structural support to the overall frame, and structural rigidity for supporting the rotor shaft to facilitate minimizing deflections of the shaft during engine operation. Accordingly, the struts are subjected to stresses induced by the engine during operation. Over time, flexture of the strut sidewalls due to low cycle fatigue or high cycle fatigue loading may eventually cause fatigue cracking within the strut sidewalls.

To facilitate reducing the effect of fatigue loading induced to the struts, at least some known struts include a damping device, a room temperature vulcanized (RTV) silicone, or a combination of the two. The damping devices are coupled to the engine frames to facilitate reducing vibrational stresses induced through the struts. However, such devices are expensive and are typically only coupled to the frame when the struts are not coupled in operating position within the gas turbine engine. In addition, a repair to any element of the front frame that requires either brazing or welding, is equally expensive because the whole front frame must be subjected to a heat-treatment process to eliminate localized stresses that could be an initiation sites for subsequent cracks.

The RTV silicones are injected into the strut, cavity to facilitate damping vibrational stresses induced to the strut. However, although such silicones are every cost-affordable in comparison to the damping devices, such silicones may only provide limited vibrational damping, and do not increase the structural integrity of the strut.

BRIEF SUMMARY OF THE INVENTION

In one aspect of the present invention, a method for installing an expandable stiffener is provided. The method comprises providing an assembly including a first sidewall and a second sidewall connected at a leading and trailing edge such that a cavity is defined therebetween, forming an opening extending through the first sidewall and the second sidewall, inserting a first expandable sleeve through the assembly opening such that the sleeve extends between the first and second strut sidewalls, and coupling the sleeve to the first and second sidewalls.

In another aspect of the invention, a strut for a gas turbine engine is provided. The strut includes a first sidewall, a second sidewall, and at least one expandable sleeve. The first sidewall includes an opening extending therethrough. The second sidewall is connected to the first sidewall at a leading edge and at a trailing edge such that a cavity is defined between the first and second sidewalls. The second sidewall includes an opening extending therethrough that is concentrically aligned with respect to the first sidewall opening. The at least one expandable sleeve extends through the first and second sidewall openings and between the first sidewall and the second sidewall. The sleeve is configured to facilitate increasing a fatigue life of s aid strut.

DETAILED DESCRIPTION OF THE INVENTION

Figure 1:
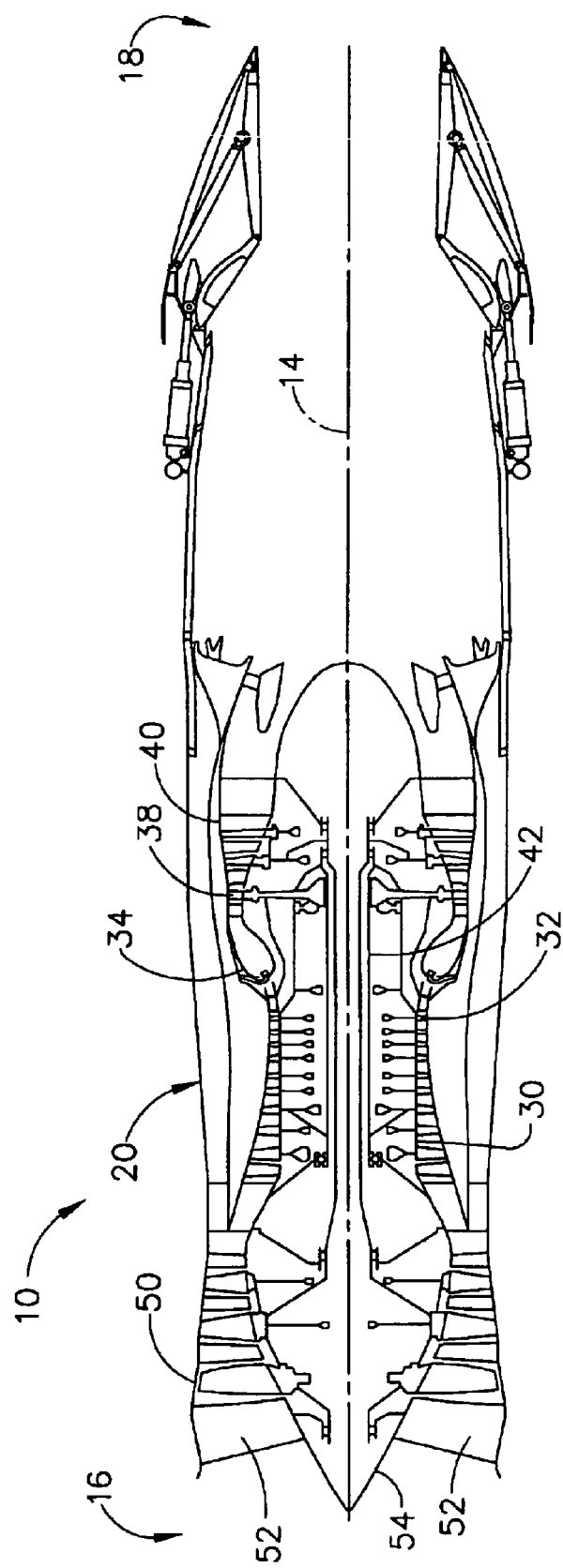
FIG. 1 Is a cross-sectional side view of a gas turbine turbofan engine including a plurality of engine struts.

FIG. 1 is a cross-sectional side view of a gas turbine turbofan engine 10 including a generally longitudinally extending axis or centerline 14 extending from an inlet end 16 of engine 10 aftward to an exhaust end 18 of engine 10. Engine 10 includes a core engine 20 which includes a low pressure compressor 30, high pressure compressor 32, a combustor 34, a high pressure turbine 38, and a power turbine or a low pressure turbine 40, all arranged in a serial, axial flow relationship. Compressor 32 and turbine 38 are coupled by a first rotor shaft 42. In one embodiment, engine 10 is an F110 engine available from General Electric Aircraft Engines, Cincinnati, Ohio Engine 10 also includes an annular frame 50 which supports a bearing (not shown) which, in turn, supports one end of a shaft, such as shaft 42, for allowing rotation thereof. A plurality of circumferentially-spaced struts 52 extend between an outer structural case ring (not shown) and a center hub 54 and direct airflow entering engine 10 downstream to core engine 20. Struts 52 are hollow and are fixedly joined to the outer structural ring and hub 54.

Figure 2:
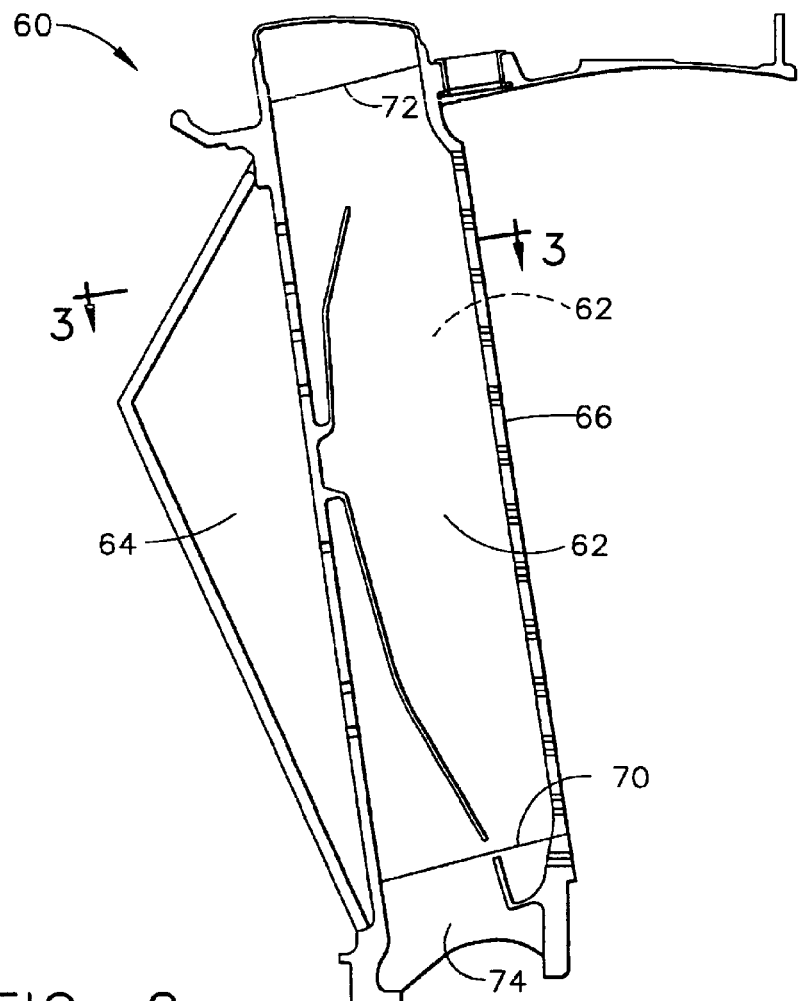
FIG. 2 is an axial, cross-sectional side view of an engine strut shown in FIG. 1.

FIG. 2 is an axial, cross-sectional side view of an engine strut 60, such as engine strut 52 (shown in FIG. 1). Strut 60 includes a pair of sidewalls 62 connected at a leading edge 64 and a chordwise-spaced trailing edge 66, such that a cavity (not shown in FIG. 2) is defined therein. Each sidewall 62 extends longitudinally, or radially outwardly, in span from a radially inner edge 70 to an opposite radially outer edge 72. Struts 60 are hollow and in the exemplary embodiment, include a platform 74 used to conventionally joint each strut 60 to a hub (not shown in FIG. 2), such as hub 54 (shown in FIG. 1). In an alternative embodiment, struts 60 are formed integrally with the hub.

Figure 3:
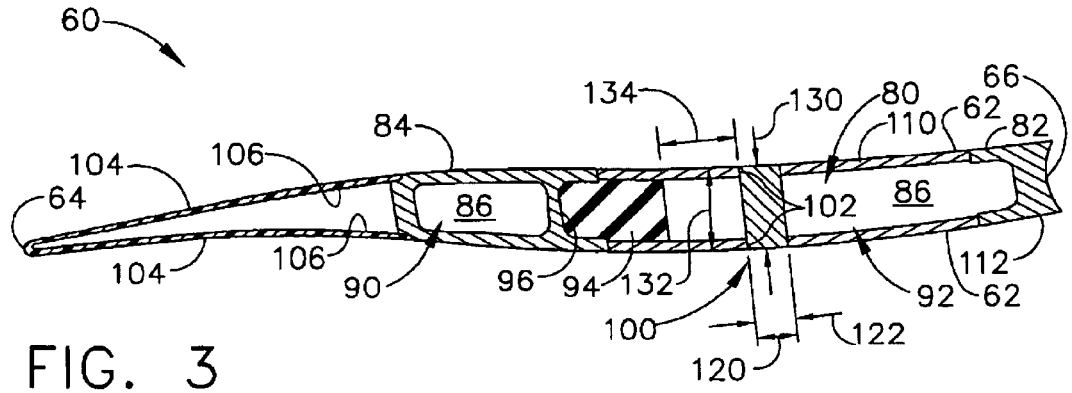
FIG. 3 is a cross-sectional view of the strut shown in FIG. 2 taken along line 3—3.

FIG. 3 is a cross-sectional view of strut 60 taken along line 3—3 (shown in FIG. 2). Strut sidewalls 62 are connected at leading and trailing edges 64 and 66, respectively, such that a cavity 80 is defined therein. More specifically, a generally U-shaped end support member 82 extends between sidewalls 62 to form strut trailing edge 66.

An internal strut stiffener 84 is generally disposed between strut sidewalls 62 to facilitate resisting buckling of sidewalls 62. Stiffener 84 extends radially along strut walls 62 between radially inner edge 70 and radially outer edge 72. In one embodiment, stiffener 84 is corrugated and has a shape similar to a honeycomb or square wave. Stiffener 84 divides cavity 80 into a plurality of cavity cells 86. More specifically, stiffener 84 divides cavity 80 into a leading edge cavity 90 and a body cavity 92.

It is known to facilitate reducing induced strut vibrations through silicone rubber injection damping. More specifically, in the exemplary embodiment, a room temperature vulcanized (RTV) silicone 94 has been injected into strut cavity 80 to provide limited vibrational damping within strut 60. For example, in one embodiment, the viscoelastic material used is Kalrez® manufactured by the Dupont Chemical Company. Silicone 94 is injected adjacent an aft side 96 of stiffener 84, and silicone 94 does not extend longitudinally between radially inner edge 70 and radially outer edge 72, but rather only extends partially between inner and outer edges 70 and 72, respectively. Viscoelastic material, as used herein, is a name given to a class of materials that displays a stretching or elongation response usually referred to as a strain to an external stress that is dependent on the initial stress, on the strain, and on either the time rate of application of the stress or the time rate of change of the strain. These materials usually exhibit a time lag in the strain relative to the stress and usually exhibit creep under a constant applied stress.

To further facilitate reducing vibrational stresses within strut 60, each strut 60 includes a sleeve assembly 100 extending through openings 102 formed within strut sidewalls 62, and coupling sidewalls 62 together. Sleeve assembly 100 is expandable and is fabricated from a material that is plastically deformable. For example, sleeve assembly 100 may be fabricated from, but is not limited to, stainless steel, or nickel alloy. More specifically, each sidewall 62 includes an outer surface 104 and an inner surface 106 that defines strut cavity 80. A first sidewall 110 and a second sidewall 112 each include a concentrically-aligned opening 102 that extends between sidewall inner and outer surfaces 106 and 104, respectively.

Opening 102 has a diameter 120 that is approximately equal to, or slightly larger than a largest outer diameter 122 of sleeve assembly 100. Sleeve assembly 100 is mechanically coupled within strut 60 by a plastic deformation process, described in more detail below. More specifically, sleeve assembly 100 extends from first sidewall outer surface 104 across cavity 80 to second sidewall outer surface 104. Sleeve assembly 100 has a length 130 that is slightly larger than a drop distance 132 between first and second sidewall outer surfaces 104, such that when coupled within strut 60, sleeve assembly 100 facilitates minimizing disruptions to airflow passing strut 60. Furthermore, opening 102 is positioned a distance 134 downstream from stiffener 84 such that when sleeve assembly 100 is inserted through opening 102, sleeve assembly 100 does not contact or disrupt viscoelastic material 94.

During engine operation, silicone rubber injection damping is a form of viscoelastic damping that has good damping characteristics and overcomes some of the limitations of at least some of the other known damping methodologies, however, there are still drawbacks to its use in struts, such as strut 60, on aircraft engines, such as engine 10 (shown in FIG. 1). For example, during installation, viscoelastic material is injected into strut cavity 80 and cured. Once there, the viscoelastic material becomes an integral part of strut 60. However, if a strut 60 has to be brazed or welded the entire front frame 50 (shown in FIG. 1) must be heat treated at a temperature that would cause any viscoelastic material 94 in struts 60 to melt and/or burn and may clog up cooling or anti-icing passages (not shown) within strut cavity 80. Furthermore, material 94 provides little, if any, additional structural integrity to strut 60, unlike sleeve assembly 100 which couples strut sidewalls 62.

During engine operation, multiple pure tones and vibrational stresses may be produced, for instance, by physical variations In the turbine blading (not shown) and when the fan blades are operating at transonic or supersonic speeds. In such operational modes, multiple pure tones may travel forward to excite or vibrate struts 60. The induced vibrational stresses produces bending or flexural and/or torsional movement of strut sidewalls 62. Sleeve assembly 100 facilitates reducing flexing of sidewalls 62 and damps vibrational stresses induced to strut 60, and significantly increase damping within strut 60 for substantially all modes of excitation and substantially all multiple pure tone frequencies.

Figure 4:
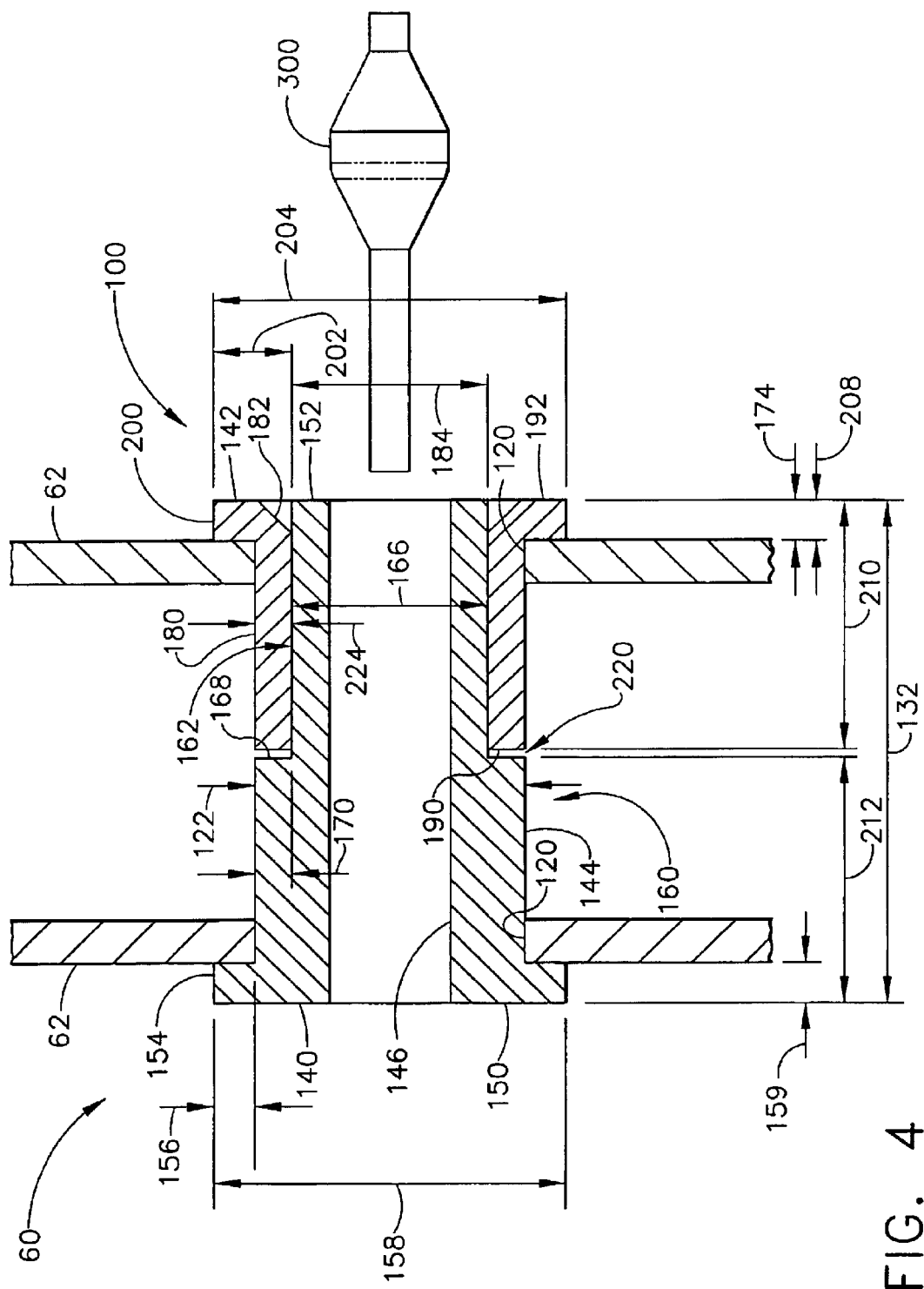
FIG. 4 is a cross-sectional schematic view of the strut shown in FIG. 3.

FIG. 4 is a cross-sectional schematic view of strut 60 and sleeve assembly 100. Sleeve assembly 100 includes a first sleeve 140 and a second sleeve 142. First sleeve 140 is hollow and has an outer surface 144 and an inner surface 146. Sleeve assembly outer diameter 122 is measured with respect to first sleeve outer surface 144, and sleeve assembly length 130 is measured with respect to first sleeve 140. More specifically, first sleeve length 132 measured between a first end 150 and a second end 152. A collar 154 extends radially outward a distance 156 from sleeve 140 at first end 150. More specifically, collar 154 has a diameter 158 that is larger than sidewall opening 120, such that collar 154 prevents first sleeve first end 150 from entering sidewall opening 102. Furthermore, collar 154 has a thickness 159.

First sleeve 140 also includes a first body portion 160 and a second body portion 162. First body portion 160 extends between collar 150 and second body portion 162, and has outer diameter 122. Second body portion 162 extends from first body portion 160 to first sleeve second end 152, and has an outer diameter 166 that is smaller than first body portion outer diameter 122. Accordingly, first sleeve 140 is stepped such that first body portion 160 has an end surface 168 that extends radially outwardly and substantially perpendicularly from second body portion 162. More specifically, first body portion end surface 168 has a thickness 170 measured between first body portion outer surface 144 and second body portion 162.

First sleeve length 132 permits second body portion 162 to extend from second sidewall outer surface 104 a distance 174 when first sleeve 140 is inserted through strut 60 such that first end collar 154 is against an outer surface 104 of first sidewall 110. Distance 174 is approximately equal first sleeve collar thickness 159 such that first sleeve ends 150 and 152 extend outwardly an approximate equal distance from strut 60.

Second sleeve 142 is hollow and has an outer surface 180 and an inner surface 182. Second sleeve 142 has an outer diameter 122 measured with respect to second sleeve outer surface 180. Second sleeve 142 also has an inner diameter 184 measured with respect to second sleeve inner surface 182. Second sleeve inner diameter 184 is slightly larger than first sleeve second body portion diameter 166, and accordingly, is sized to receive first sleeve second body portion therethrough in close tolerance.

Second sleeve inner diameter 184 is substantially constant between a first end 190 and a second end 192 of second sleeve 142. More specifically, second sleeve inner surface 182 is outwardly chamfered at second sleeve second end 192, and as such second sleeve inner diameter 184 is increased at second sleeve second end 192.

Second sleeve 142 also includes a collar 200 at second sleeve second end 192. Collar 200 extends radially outward a distance 202 from second sleeve 142 at second end 192. More specifically, collar 200 has a diameter 204 that is approximately equal first sleeve collar diameter 158. Accordingly, second sleeve collar diameter 204 is larger than sidewall opening 120, such that collar 200 prevents second sleeve second end 192 from entering sidewall opening 102. Furthermore, collar 200 has a thickness 208 that is approximately equal first sleeve distance 174.

Second sleeve 142 has a length 210 measured between first and second ends 190 and 192. Second sleeve length 210 is less than a length 212 of first sleeve second body portion 162. Accordingly, when first sleeve 140 is inserted within strut 60 from first sidewall 110, and when second sleeve 142 is inserted within strut 60 from second sidewall 112, a gap 220 is defined between second sleeve 142 and first sleeve first body portion end sleeve 168. Second sleeve 142 also has a thickness 224 measured between second sleeve inner and outer surfaces 182 and 180, respectively, that is approximately equal first body portion end surface thickness 170.

During assembly of strut 60, initially an alignment fixture (not shown) is coupled to strut 60. The alignment fixture securely couples each strut sidewall 62 in position relative to the remaining sidewall 62, thus facilitating alignment of openings 102 through sidewalls 62. A pilot hole is first drilled at a center point (not shown) of a desired location of opening 102. The pilot hole is then reamed to form each opening 102. In one embodiment, multiple reamers are used to form openings 102.

Drop distance 132 is then determined, such that a sleeve assembly length 130 may be determined. In one embodiment, sleeve assemblies 100 are pre-fabricated such that sleeves 140 and 142 form assemblies having a plurality of lengths 130. First sleeve 140 is then inserted through first sidewall opening 102 and through second sidewall 112, such that first sleeve collar 154 is positioned against first sidewall outer surface 104, and first sleeve second end 152 extends a distance 174 from second sidewall outer surface 104. Second sleeve 142 is then inserted through second sidewall opening 102 and towards first sidewall 110, such that second sleeve collar 200 is positioned against second sidewall outer surface, and such that second sleeve 142 is radially outward from first sleeve second body portion 162. Accordingly, when fully sleeves 140 and 142 are fully inserted within strut 60, first sleeve second body portion 162 is received in close tolerance within second sleeve 142.

A mandrel 300 is then pulled through sleeve assembly 100. More specifically, mandrel 300 is drawn through sleeve assembly 100 from second sidewall 112 through first sidewall 100. Mandrel 300 is known in the art. In an alternative embodiment, a manual fine threaded puller is drawn through sleeve assembly 100 rather than mandrel 300. As mandrel 300 is drawn through sleeve assembly 100 in a process known as cold expansion, sleeve assembly 100 is plastically deformed within sidewall openings 102, such that sleeve assembly 100 is retained and mechanically locked in position within strut 60. Sleeve assembly expansion gap 220 facilitates plastic deformation between sleeves 140 and 142, such that primary retention of sleeve assembly 100 is from compression between each respective sleeve 140 and 142, and sidewall outer surface 104, and compression between sleeves 140 and 142. In addition, the chamfer of second sleeve 142 facilitates retention margin of sleeve assembly 100. The alignment fixture is then removed, and sidewalls 62 are coupled by sleeve assembly 100.

Sleeves 140 and 142 enable sleeve assemblies 100 to be installed while struts 60 are coupled within engine 10. More specifically, sleeve assemblies 100 may be installed to facilitate vibration damping without requiring struts 60 to be uncoupled from engine frame 50, without requiring engine frame 50 to be uncoupled from engine 10, and without requiring heat treatments.

The above-described expansion sleeve assembly includes a stepped first sleeve and a second sleeve that define an expansion gap therebetween. The sleeve assembly is installed in a cold expansion process that enables the sleeve assemblies to be coupled within struts to facilitate vibration damping without requiring a time-consuming heat treatment process. As a result, the sleeve assembly facilitates reducing induced vibrations within engine frame struts in a cost-effective and reliable manner.

While the invention has been described in terms of various specific embodiments, those skilled in the art will recognize that the invention can be practiced with modification within the spirit and scope of the claims.

What is claimed is:

1. A method for installing an expandable stiffener, said method comprising:

providing an assembly including a strut having a first sidewall and a second sidewall connected at a leading and trailing edge such that a cavity is defined therebetween;

forming an opening extending through the first sidewall and the second sidewall;

inserting a first expandable sleeve through the assembly opening such that the sleeve extends across the cavity and between the first and second strut sidewalls;

coupling the sleeve to the first and second sidewalls; and inserting a second sleeve into the opening such that the second sleeve extends from one of the first and second sidewalls partially across the cavity.

2. A method in accordance with claim 1 wherein forming an opening further comprises aligning the first sidewall opening substantially concentrically with respect to the second sidewall opening.

3. A method in accordance with claim 1 wherein coupling the sleeve further comprises radially expanding the sleeve within the first sidewall and the second sidewall to secure the sleeve within the strut.

4. A method in accordance with claim 3 wherein radially expanding the sleeve further comprises drawing a mandrel through the sleeve to secure the sleeve to the sidewalls.

5. A method in accordance with claim 4 wherein drawing a mandrel through the sleeve further comprises drawing the mandrel from a first end of the sleeve through the sleeve and through a second end of the sleeve.

6. A method in accordance with claim 1 wherein inserting a first expandable sleeve through the opening further comprises inserting the first sleeve through the opening such that the sleeve extends through both the first and second sidewalls and is configured to couple the first sidewall to the second sidewall.

7. A method in accordance with claim 1 wherein inserting a second sleeve into the opening further comprises inserting the second sleeve into the opening such that a portion of the first sleeve is radially inward from the second sleeve.

8. A method in accordance with claim 1 wherein inserting a second sleeve into the opening further comprises inserting the second sleeve into the opening such that a gap is defined between an end of the second sleeve and a portion of the first sleeve.

9. A method in accordance with claim 1 wherein inserting a first expandable sleeve through the opening further comprises inserting the first expandable sleeve through the opening, wherein the first sleeve includes a first portion having a diameter approximately equal to a diameter of the assembly opening, and a second portion having a smaller diameter than the assembly opening diameter.

10. A method in accordance with claim 9 wherein comprising inserting the second sleeve into the opening such that the second sleeve extends circumferentially around the first sleeve second portion.

11. A method in accordance with claim 10 wherein inserting a second sleeve into the opening further comprises inserting the second sleeve having a diameter that is approximately equal to the assembly opening diameter into the opening such that a gap is defined between an end of the second sleeve and the first sleeve first portion.

12. A strut for a gas turbine engine, said strut comprising:
a first sidewall comprising an opening extending therethrough;
a second sidewall connected to said first sidewall at a leading edge and at a trailing edge, such that a cavity is defined between said first and second sidewalls, said second sidewall comprising an opening extending therethrough and concentrically aligned with respect to said first sidewall opening;
a first expandable sleeve extending through said first and second sidewall openings and between said first sidewall and said second sidewall, said sleeve configured to facilitate increasing a fatigue life of said strut; and
a second sleeve extending partially through said strut cavity from one of said first sidewall and said second sidewall such that said second sleeve is concentrically aligned with respect to said first sleeve, said second sleeve comprising a first portion having a first diameter and a second portion having a second diameter.

13. A strut in accordance with claim 12 wherein said at least one expandable sleeve is coupled within said strut by drawing a mandrel through said sleeve from a first end of said sleeve to a second end of said sleeve, such that said sleeve is radially expanded within said first and second sidewall openings.

14. A strut in accordance with claim 12 wherein a portion of said second sleeve has a diameter that is approximately equal to a portion of said first sleeve first diameter, said second sleeve diameter is smaller than a diameter of said first and second sidewall openings.

15. A strut in accordance with claim 14 wherein said first sleeve second diameter is smaller than said first sleeve first diameter, said second sleeve extending circumferentially around said first sleeve second portion.

16. A strut in accordance with claim 12 wherein said second sleeve comprises an inner end and a chamfered outer end.

17. A strut in accordance with claim 16 wherein said second sleeve inner end is a distance from said first sleeve such that a predetermined gap is defined between said first sleeve and said second sleeve.

\* \* \* \* \*